D. J. FUHRER.
TRUCK ATTACHMENT FOR AUTOMOBILES.
APPLICATION FILED FEB. 23, 1922.
1,423,931.
Patented July 25, 1922.
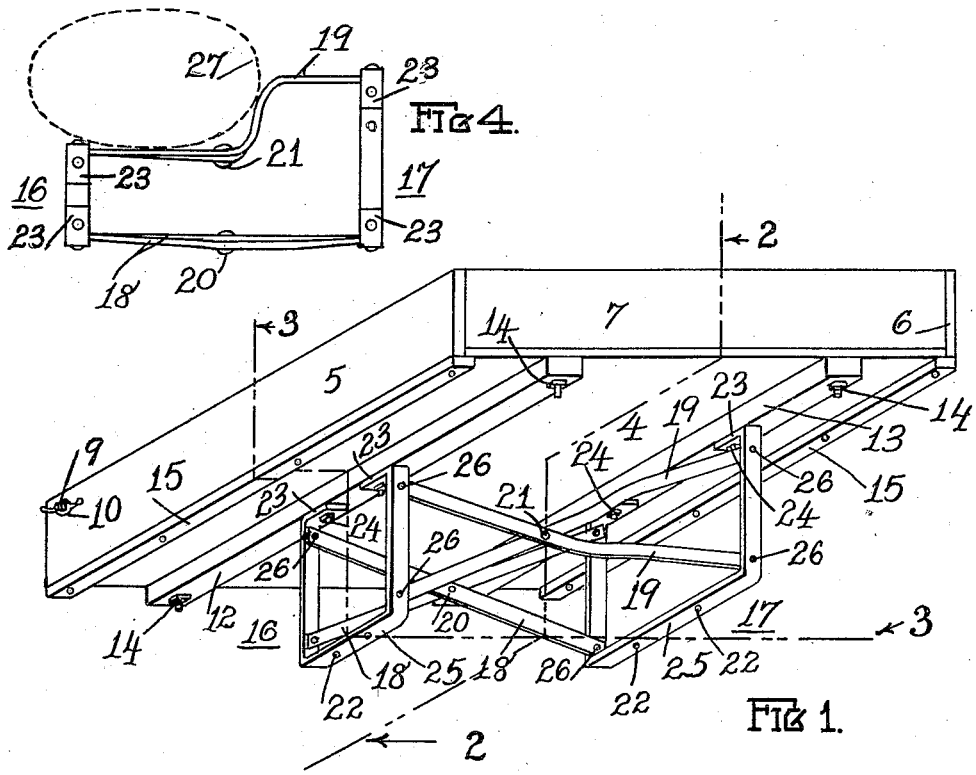
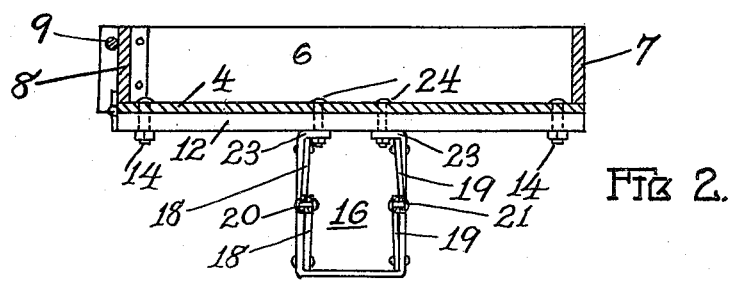
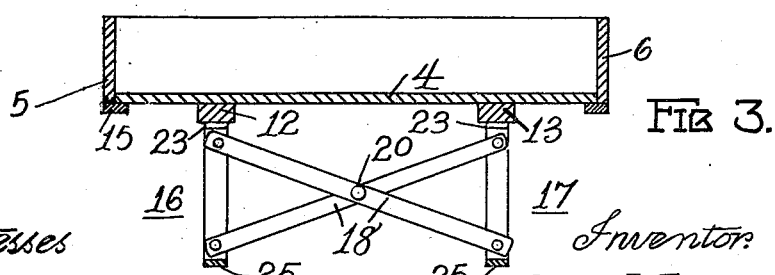

UNITED STATES PATENT OFFICE.

DANIEL J. FUHRER, OF LEANNA TOWNSHIP, LOGAN COUNTY, ILLINOIS.

TRUCK ATTACHMENT FOR AUTOMOBILES.

1,423,931. Specification of Letters Patent. Patented July 25, 1922.

Application filed February 23, 1922. Serial No. 538,727.

*To all whom it may concern:*

Be it known that I, DANIEL J. FUHRER, a citizen of the United States, residing in Leanna Township, in the county of Logan and State of Illinois, have invented a new and useful Truck Attachment for Automobiles, of which the following is a specification.

The invention relates to truck bodies attachable to and usable with the type of automobiles known as coupes, having at the rear of the vehicle body a compartment known as the "turtle-back", used to contain the gasoline tank and to receive other articles for convenient stowage.

The purposes of the present improvement are; to provide a truck body adapted to extend across the turtle-back of the coupe when the door is open; and in conjunction therewith to provide braced legs adapted to rest on the bottom of the turtle-back to support the truck body and so constructed and arranged as not to interfere with the gasoline can contained in the turtle-back; to provide a truck of simple and sturdy construction, which may be easily and quickly attached to, or detached from, the coupe; and to provide other improved structural details as will hereinafter appear.

The invention is illustrated in the accompanying drawing to which reference is hereby made, and will now be described in detail and the novel features thereof will be recited in the claim.

Figure 1 is a perspective view of a truck attachment embodying my invention, as viewed from the under side, looking upward;

Fig. 2 is a vertical longitudinal section taken on the line 2—2 of Fig. 1;

Fig. 3 is a vertical transverse section taken on the line 3—3 of Fig. 1; and

Fig. 4 is a top plan of the detached frame structure used to support the truck body.

The same reference numerals designate the same parts in all the views.

The truck body is a rectangular wooden box comprising a platform 4; sides 5 and 6; an end plate 7 permanently attached to the platform and the sides; and an end gate 8 hinged on the platform.

A screw-threaded rod 9 extends through the sides 5 and 6 and is provided with a wing nut or handle 10 screwing on the rod. The rod 9 prevents downward turning of the end gate and when the nut 10 is screwed on the rod, the rod and nut will prevent spreading of the sides 5 and 6.

Longitudinal sills 12 and 13 are firmly secured on the platform 4 by bolts 14.

Longitudinal battens 15 secured on the respective sides 5 and 6 and on the platform 4 strengthen the juncture of the sides with the platform.

The frame which supports the body in the turtle-back of the coupe comprises a relatively narrow leg 16; a wider leg 17; straight braces 18; and curved braces 19. A rivet 20 at the crossing of the straight braces 18 connects them securely together, and a rivet 21 at the crossing of the curved braces 19 connects them securely together. Rivets 26 secure the terminals of the braces 18 and 19 on the vertical members of the legs 16 and 17.

The legs 16 and 17 are the same length but differ in width. The legs have horizontal members 25 provided with holes 22 to receive bolts (not shown) for connecting the respective legs with the bottom of the turtle-back.

The legs 16 and 17 have at their upper ends flanges 23 secured on the sills 12 and 13 by bolts 24.

The leg 16 is narrower than the leg 17 in order that the leg 16 and the curved braces 19 may not interfere with the gasoline can usually contained in the turtle-back.

When the leg frame is bolted in place in the turtle-back of the coupe as hereinafter described, the gasoline tank or the like will occupy the position indicated by the dotted line 27, and the position of the leg 16 and the curved braces 19 relatively to the can 26 will be as shown in Fig. 4.

To attach the truck in the turtle-back it is only necessary to bore holes in the bottom of the turtle-back, registering with the holes 22 in the horizontal members of the legs 16 and 17; insert suitable bolts (not shown) through the bored holes and through the holes 22 and screw down the nuts on the bolts to secure the leg frame in place on the bottom of the turtle-back. To remove the truck, it is only necessary to unscrew the nuts from the inserted bolts; whereupon the truck may be lifted out of the turtle-back.

I am aware of the common use of trucks attachable to and detachable from vehicle bodies. I therefore do not claim broadly a truck of that nature, but limit my claim to the structural details herein shown and described.

Having fully described my invention what I claim as new and desire to secure by Letters Patent is:

A truck attachment comprising a box-like body; two parallel longitudinal sills and two marginal longitudinal battens fixed on and strengthening the body; a relatively narrow leg comprising a horizontal member provided with holes to receive attaching bolts, and vertical members secured on one sill; a relatively wide leg comprising a horizontal member provided with holes to receive attaching bolts and vertical members secured on the other sill; crossed straight braces connecting one vertical member of each leg on one side; and crossed braces connecting the other vertical member of each leg and curved to accommodate a can or the like.

In witness whereof I have hereunto signed my name at Mount Pulaski, Illinois, this 17 day of February, 1922.

DANIEL J. FUHRER.

Witnesses:
E. A. DOWNING,
DELLA M. ANDERSON.